Aug. 2, 1960

F. K. BENNETT 2,947,938

ELECTROTHERMAL MEASURING APPARATUS AND
METHOD FOR THE CALIBRATION THEREOF

Filed April 9, 1954

INVENTOR.
Frank K. Bennett
BY Albert F. Kronman
HIS ATTORNEY

United States Patent Office 2,947,938
Patented Aug. 2, 1960

2,947,938

ELECTROTHERMAL MEASURING APPARATUS AND METHOD FOR THE CALIBRATION THEREOF

Frank K. Bennett, Iselin, N.J., assignor to Victory Engineering Corporation, Union, N.J., a corporation of New Jersey Filed Apr. 9, 1954, Ser. No. 422,223

5 Claims. (Cl. 324—62)

This invention relates to electrothermal measuring devices and control systems and more particularly to meter and control systems employing balanced electrical circuit means for said purposes.

Thermistors and hot wire bridges employing the Wheatstone bridge principle are used to measure the thermal conductivity of gas, for R-F power measurements, as flow meters, anemometers, vacuum gauges, and the like. In these devices it has become the practice to use two elements in a balanced bridge circuit so that the circuit is not sensitive to changes in conditions which are common to both temperature-sensitive elements. To insure accurate measurements in such systems it is essential that the bridge circuit remain balanced regardless of ambient temperatures or changes in background conditions. A bridge circuit of the type referred to will remain balanced if the two thermally sensitive circuit elements are identical in every respect so that their temperature-resistance curves are congruent. However, to obtain identical elements, under present day manufacturing methods, is almost impossible. To obtain even a single pair of reasonably well matched thermally sensitive circuit elements may be prohibitively costly. This need for selecting identical elements exists whether resistors, thermistors, transistors, or simple wire sections are employed in the circuit as thermally sensitive elements. Even where presently known measuring or control devices employ thermally sensitive elements, which have been selectively chosen as being physically substantially matched, measurements based on the assumption of identical characteristics have been found to be inaccurate. Moreover, the degree of inaccuracy can not be readily determined in advance.

Accordingly, it is an object of this invention to provide a measuring circuit which will have substantially infinite stability under all ambient thermal conditions.

Another object of this invention is to provide a measuring or control circuit which will function as a balanced bridge circuit through manual or automatic adjustment to maintain predetermined calibrated thermal conditions in the thermally sensitive circuit elements.

A feature of the invention resides in the provision of two bridge circuits each of which is balanced when the thermally sensitive portion of such bridge circuit is maintained at an accurately calibrated predetermined temperature. Means are provided for energizing both bridge circuits simultaneously from a common source of adjustable potential to obtain a condition of balance in one of the bridge circuits which serve as a reference circuit. With the reference bridge balanced, any deviation from balance in the other bridge circuit is an accurate and reliable measure of a difference in the surrounding thermal conditions which are producing an ascertainable effect upon the thermally sensitive portion of the unbalanced bridge circuit with respect to the reference bridge circuit.

The invention consists of the construction, combination and arrangement of parts, as herein illustrated, described and claimed.

In the accompanying drawings, forming a part hereof are illustrated three forms of embodiment of the invention, in which drawings similar reference characters designate corresponding parts, and in which.

Figure 1:
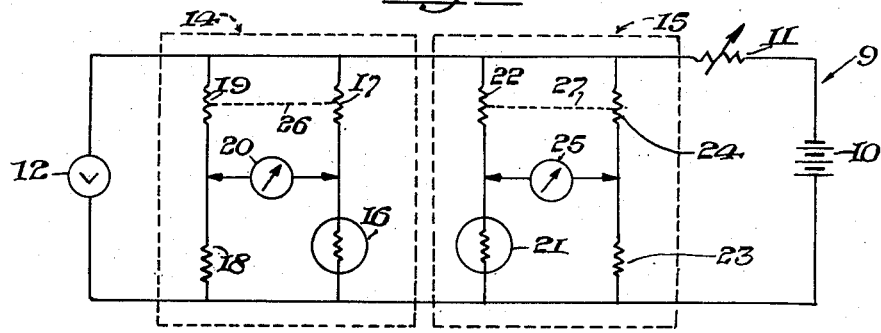
Figure 1 is a wiring diagram of an electrothermal measureing apparatus according to one embodiment of this invention.

Referring to the drawing and specifically to Figure 1, there is shown a double bridge circuit 9 in which 10 designates a battery or some other suitable source of electrical current. Connected in series with the battery 10 is an adjustable variable resistance element 11 and a voltmeter 12. Two similar bridge circuits 14 and 15 are shown connected in parallel for simultaneous energization at the same voltage from battery 10 through adjustable resistor 11 in multiple with the voltmeter 12. Bridge circuit 14 serves as the measurement bridge and bridge circuit 15 as the reference bridge.

The right hand side of measurement bridge circuit 14 comprises, a thermally sensitive circuit element 16, such as a thermistor, connected in series with an adjustable resistor 17. The element 16 has a temperature-resistance characteristic which is not susceptible of accurate and precise predetermination during the course of its manufacture and this characteristic is such as to cause large changes in the resistance of element 16 to accompany relatively small changes in its temperature. The left hand side of measurement bridge 14 comprises, a fixed resistor 18 connected in series with an adjustable resistor 19. An unbalance measuring meter 20 is shown centrally connected between the two sides of measurement bridge 14 and is arranged to indicate the magnitude of any unbalance therein.

The reference bridge 15 is similar to the measurement bridge 14 described above. In its left hand side there is a temperature sensitive circuit element 21 which is similar to thermistor element 16 of measurement bridge 14, and the temperature sensitive thermistor element 21 is connected in series with an adjustable resistor 22. The right hand side of reference bridge 15 comprises, a fixed resistor 23 connected in series with an adjustable resistor 24. A null indicating meter 25 is connected between the two sides of reference bridge 15 for determining when the reference bridge is in balanced condition.

The adjustable resistors 17 and 19 which constitute the ratio arms of measurement bridge 14 are ganged together for simultaneous adjustment as indicated by the dotted line 26. The adjustable resistors 22 and 24 of reference bridge 15 are similarly ganged together as indicated by the dotted line 27.

For illustration and descriptive purposes only, the following disclosure will describe the invention as it would be applied to a gas flow meter system.

Figure 2:
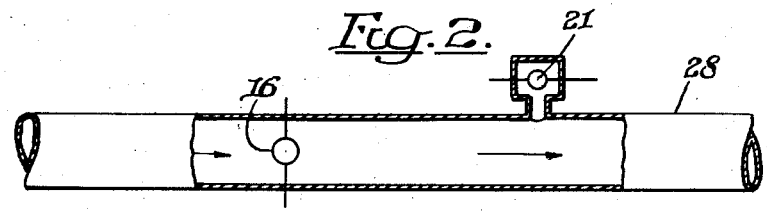
Figure 2 is a schematic view partly broken away and represented in longitudinal section showing the physical positions of the two thermally sensitive elements as applied to a fluid transmission conduit.

The thermistor 16 (shown in Figure 2) is operated at an elevated temperature (200° C. for example) and is positioned within a gas conduit 28 so as to be in the direct path of the flow of gas and to be cooled thereby in accordance with the gas velocity. A condition-responsive element or thermistor 21 is positioned adjacent the conduit 28 in a lateral extension therefrom so that it will not lie in the direct flow of gas therein, but will be exposed to the same gas in a substantially stationary condition. The thermistor 21 may be considered the reference thermistor and is kept at a reference temperature as hereinafter explained. This arrangement of the thermistors 16 and 21 exposes both temperature sensitive circuit elements to the same ambient or "background" conditions, and at the same time allows only thermistor 16 to be cooled in accordance with the volume of gas flow sought to be measured.

The selection and adjustment of the temperature sensitive elements and resistors comprising the circuit described in Figure 1, is carried out as follows:

Two commercially available thermistors 16 and 21 are selected. Such choice need not be restricted by a precise regard to their similarity or identity of behavior. After selection, the respective resistance values of the thermistors 16 and 21 at some elevated temperature (as for example 200° centigrade) is then accurately determined. The fixed resistors 18 and 23 are then arranged by known methods of permanent adjustment to have resistance values which are precisely equal to the respective accurately determined resistance values of the thermistor elements 18 and 20 at the predetermined temperature of 200° centigrade. The ganged adjustable ratio arm resistors 17 and 19 of measurement bridge 14 are of equal resistances throughout their common range of adjustment. The corresponding adjustable resistors 22 and 24 or reference bridge 15 are similarly equal.

With the circuit elements selected as above described, the double bridge circuit 9 is adjusted in the following manner:

Some suitable calibration voltage is applied to the double bridge circuit and is maintained constant as indicated at voltmeter 12 by adjustment of the variable resistor 11. This calibration voltage is applied with no gas flow through the conduit 28 and some gas present and surrounding the measurement thermistor 16 and reference thermistor 21. The equal ratio arm resistors 17 and 19 are then simultaneously varied until the measurement meter 20 indicates zero. Thereafter, the two equal resistors 22 and 24 of reference bridge 15 are adjusted simultaneously until the null indicating meter 25 reads zero. With the resistances thus calibrated and adjusted to maintain zero meter readings simultaneously on both of the meters 20 and 25, the resistors 17, 19, 22, and 24 may be replaced by fixed resistors having the same respective accurately determined resistance values. The means indicated at 26 and 27 for simultaneously adjusting the ratio arm resistors now may be eliminated from the circuit.

The aforesaid calibration and adjustment procedure and selection of resistors 17, 19, 22 and 24 necessarily heats the thermistors 16 and 21 to the previously selected reference temperature (200° C.), under a static condition with no gas flow and with both of the thermistors simultaneously exposed to the same "background" thermal conditions. Therefore both of the two bridges 14 and 15 are initially balanced and the temperatures of the thermistors 16 and 21 are equal. Since the thermistors are at equal temperatures under reference or calibration conditions, any change in the resistance of thermistor 16 indicated by measurement meter 20 will reflect the measure of volumetric gas flow which produces a cooling influence on measurement thermistor 16.

The double bridge circuit 9 after calibration and adjustment, as described may now be used to measure the gas flow in the conduit 28. With gas flow through the conduit 28, it is possible to maintain a continuous resistance ratio between the thermistors 16 and 21, though there may be a change in "background" conditions such as gas temperature and pressure and regardless of the dissimilarity of the thermistors. This calibrated condition is maintained by adjustment of the variable resistor 11 so that the reading of the null indicating reference meter 25 is kept at zero. Since, by regulation of the bridge energizing voltage the temperature and therefore the resistance of reference thermistor 21 is maintained constant at the preselected temperature of 200° centigrade, the meter reading of meter 20 will accurately measure volume of gas flow.

Figure 3:
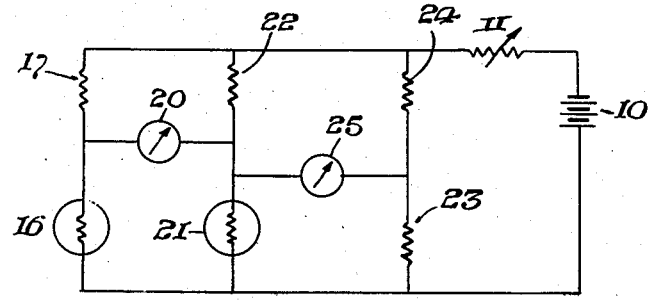
Figure 3 is a wiring diagram of a simplified electrical measuring circuit forming a second embodiment of this invention.

The double bridge circuit 9 above described and shown in Figure 1 may be simplified as shown in Figure 3. Once the bridge circuit 9 has been calibrated and adjusted, resistors 18, 19 and voltmeter 12 may be eliminated from the circuit. In this simplified bridge circuit, measurement meter 20 is adjustably connected between the resistors 17 and 22. Under the calibration adjustment conditions, for the double bridge circuit 9 shown in Figure 1, the resistors 17 and 22 are adjusted until measurement meter 20 indicates zero while reference meter 25 also reads zero. The meter 20 is then permanently tapped in on the resistors 17 and 22. In the operation of the circuit (as shown in Figure 3), variable resistor 11 is always adjusted so that reference meter 25 maintains a zero reading. With the reference bridge portion of the circuit continuously balanced to produce calibrated conditions, any deflection of the measurement meter 20 will be an accurate measurement of gas flow.

In both the bridge circuits described and shown in Figures 1 and 3, a change in "background" thermal conditions common to both thermistors 16 and 21 in the conduit 28, such as temperature change of the gas or a change in the gas itself, will not inject error into the system. In addition, the inherent structural and behavior differences between the two thermistors will not cause error in the indicated readings of the measurement meter 20, as the complete circuit has been initially calibrated and balanced (at no gas flow) to render ineffective the aforesaid differences between characteristics of the thermistors.

Figure 4:
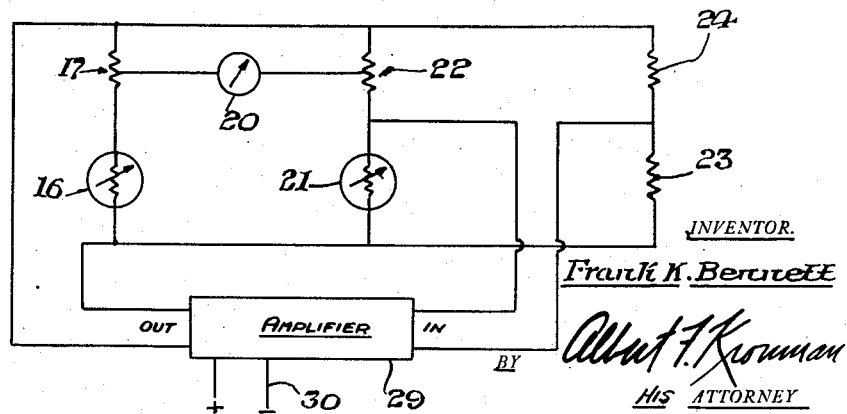
Figure 4 is a wiring diagram of a third embodiment of the present invention showing self-oscillatory means for automatically maintaining reference conditions in the reference bridge circuit.

Figure 4 shows a circuit which has incorporated therein a means for automatic continuous adjustment of the bridge voltage to maintain reference temperature conditions in the thermistors 16 and 21. In this circuit a high gain amplifier 29 haivng band pass frequency selecting characteristics replaces the null indicating reference meter 25 and the variable resistor 11 and battery 10 in the circuit shown in Figure 3. The resistors 17, 19, 22 and 24, are determined by the same steps and by employing the same circuit as described for the second embodiment of this invention (Figure 3). After the selection of the resistors the amplifier 29 is then electrically connected into the circuit, and meter 25, resistors 18 and 19 are eliminated therefrom as shown in Figure 4. A source of electrical current is shown entering the amplifier 29 at 30.

When the amplifier is first turned on, because of unbalance in the reference bridge, the loop gain through the external circuit is high, causing oscillations at a frequency determined by the transmission characteristics of the self oscillatory feed back path through amplier 29. Continued current flow heats up reference thermistor 21, and as the said thermistor is heated to its reference temperator it approaches the resistance value of resistor 23. The total loop gain must be zero for stable operation of the circuit, so if the gain of the amplifier is high, the circuit will settle down to stable operation with the actual resistance of the thermistor 21 very nearly equal to the resistance of the fixed resistor 23. Thereafter, the heating effect of the output of amplifier 29 which energizes the bridge circuit maintains the resistance of the reference thermistor 21 equal to the resistance of the resistor 23. It may be necessary to reverse either the input or the output connections to the amplifier 29 to achieve stable operation depending on whether the thermistors have a positive or negative temperature coefficient of resistance.

It will be readily seen from the foregoing disclosure that are electro thermal measuring circuit employing a balanced bridge circuit has been provided which does not require identical characteristics for the thermally sensitive elements. The measuring circuits disclosed accurately indicate the condition to be measured, substantially free of error, because a reference calibration condition can always be maintained. The ability to maintain this reference condition counteracts the varying effects imparted to the circuit by changes in thermal "background" conditions and compensates for the inherent differences between the characteristics of the thermally sensitive elements.

Having thus fully described the invention, what is claimed as new and desired to be secured by Letters Patent of the United States is:

1. In electro thermal measuring apparatus of the class described, in combination: first and second thermally sensitive circuit elements, each of which has an individual accurately measured resistance value at the same fixed elevated reference temperature, each of said resistance values varying in accordance with changes in the thermal conditions to which such element is subjected; means for maintaining said first element under reference thermal conditions and applying an equal adjustment to the second element; means for varying the temperature of said second element by exposure to the thermal condition to be measured; precalibrated circuit means for simultaneously energizing both of said elements to heat the same and bring both of said resistance values simultaneously to said accurately measured values when said elements are both simultaneously maintained under said reference thermal conditions; a first resistance measuring means connected with said first element for determining when its resistance has attained said accurately measured value while energized by said circuit means; and a second resistance measuring means connected with said second element during energization thereof by said circuit means for determining the magnitude of any deviation in its resistance from said accurately measured value, the magnitude of said deviation being determinative of the thermal effect of said thermal condition to be measured.

2. The combination according to claim 1, wherein said first resistance measuring means is a normally balanced bridge circuit of which said first element forms an arm; and in which said second resistance measuring means is a further bridge circuit of which said second element forms an arm, said further bridge circuit comprising means for measuring the unbalance therein caused by said resistance deviation of said second element while said balanced bridge circuit is in balanced condition.

3. The combination according to claim 2, in which said circuit means connects said bridge circuits for simultaneous energization from a common source, and wherein said circuit means comprises adjustable means for varying the energizing voltage applied to said bridge circuits to bring said first-named bridge circuit to its normal condition of balance.

4. The combination according to claim 3, in which said bridge circuits are connected for energization in multiple, and wherein said circuit means comprises amplifying means having an output connected to portions of said first-named bridge circuit which are conjugate with respect to said energization connection and an input connected to said energization connection to provide a feed back path through said amplifying means which has substantially infinite attenuation when said first-named bridge circuit is balanced whereby both of said bridge circuits are energized to a degree which brings said first-named bridge circuit substantially in said balanced condition.

5. The method of mataining the accuracy of a balanced multi-bridge measuring circuit containing self heated reference and sensing thermally sensitive elements in separate bridge circuits comprising, the steps of self heating the thermally sensitive elements to an elevated temperature, balancing, by means of suitable fixed resistors, each of the bridge circuits, adjusting the reference bridge circuit during the operation of the measuring circuit by adjusting the voltage impressed across both bridge circuits to maintain said reference bridge at its original reading while simultaneously applying an equal adjustment to the sensing bridge circuit.

References Cited in the file of this patent

UNITED STATES PATENTS

| | | |
|---|---|---|
| 1,379,266 | Keeler | May 24, 1921 |
| 2,375,273 | Black | May 8, 1945 |
| 2,396,420 | Hayward et al. | Mar. 20, 1946 |
| 2,468,625 | Goetz | Apr. 26, 1949 |
| 2,635,225 | Hadady | Apr. 14, 1953 |
| 2,694,928 | Jacobson | Nov. 23, 1954 |